Patented Mar. 11, 1941

2,234,246

UNITED STATES PATENT OFFICE 2,234,246

METALLIC COMPOSITION

Walter Henry Groombridge and John Edward Newns, Spondon, near Derby, England, assignors to Celanese Corporation of America, a corporation of Delaware No Drawing. Application November 26, 1938, Serial No. 242,563. In Great Britain December 9, 1937

8 Claims. (Cl. 252—257)

This invention relates to new metallic compositions and more particularly compositions suitable for use as catalysts in chemical processes.

The compositions of the invention comprise two heavy metals oxidisable to oxides which are reducible by hydrogen or carbon monoxide, one of said metals being in porous form and permeated by the other and at least one of said metals having catalytic activity. The compositions of the invention may be produced by a process which comprises heating an intimate mixture of the metal having the greater affinity for oxygen with the oxide of the other metal to a high temperature so that the metal reduces the oxide and is itself oxidized and thereafter subjecting the product to reduction.

The metal oxide used should be reducible at a temperature sufficiently low to avoid fusion or excessive sintering of the resulting metal. Copper oxide is of outstanding importance as the oxide with which to heat the metal of higher affinity for oxygen.

The metal and metal oxide are intimately mixed before being heated and to this end it is preferred to employ the substances in a very fine state of division. Thus, the metal may be employed in the form of very fine filings and the oxide as a finely ground powder. The substances may be employed in about equal proportions by weight, but this is not essential, for instance the proportions may be such that the product contains substantially more of the metal of lower affinity for oxygen than of the metal of higher affinity with which it is permeated.

The temperature to which the mixture of metal and oxide is heated is preferably above 500° C., temperatures of 750–850° or even higher, e. g. 900° C., giving excellent results. The product obtained is hard but can be broken into particles or granules of a size suitable for use as a catalyst by an ordinary milling operation. The product, preferably after milling and grading, is subjected to reduction and usually it is convenient to effect the reduction with a commercial carbon monoxide-hydrogen mixture such as water gas or producer gas. The reduction should not be carried out at such a high temperature as to cause fusion or excessive sintering of the product. Reducing temperatures between about 300 and 700° C., e. g. 350–500° C. depending on the nature of the metal of higher affinity for oxygen, may be mentioned. Copper-nickel and copper-cobalt compositions, i. e. compositions containing the oxides of these metals, are preferably reduced at lower temperatures than corresponding compositions containing iron instead of cobalt or nickel.

In the reduced product the metal of lower oxygen affinity is in a highly porous form and is permeated by the metal of higher affinity. The thoroughness of the permeation depends to a large extent upon the care taken in effecting intimate admixture of the starting materials and upon the conditions obtaining during the heat treatment. The high degree of permeation obtainable may be at least in part a result of the transference of oxygen from the oxide of the one metal to the other metal during the heating and it is preferred that the oxide employed in the initial mixture should be a higher oxide, e. g. cupric oxide or the sesquioxides of nickel and cobalt.

In use as a catalyst the reduced product is remarkable for its lack of friability and may be used for considerable periods without disintegration. Even repeated changes in temperature, for instance when the catalytic process is interrupted for regeneration or reactivation of the catalyst do not cause serious damage to the catalyst. A highly porous nature and hence a high surface:volume ratio and a high thermal conductivity are valuable features of the novel catalysts.

An important embodiment of the present invention is the production of catalysts containing nickel and/or cobalt in conjunction with, e. g. supported on, copper or iron, and the use of these catalysts in hydrogenation processes, especially the hydrogenation of oxides of carbon to produce hydrocarbons. The invention may, however, be applied to the production of catalysts for use in other processes, for instance the production of acetone from ethyl alcohol. The compositions of the invention may be employed in processes wherein both the heavy metals present contribute to catalyse the reaction. Moreover, the compositions may be employed in reactions in which the metals present play the part of reagents rather of catalysts in the strict sense, e. g. in combining with and removing oxygen and halogens from compounds.

The following examples illustrate the production of a metallic composition according to the invention:

*Example 1*

An intimate mixture of equal parts by weight of copper oxide and nickel powder is heated in a fire-clay crucible to about 900° C. The copper oxide is thereby reduced to the cuprous state with corresponding oxidation of the nickel. The resulting substantially homogeneous mass is broken into pieces of ⅛"-¼" mesh and reduced in a current of water gas at about 350° C. The resulting composition is suitable for use as a catalyst in the reduction of carbon monoxide to a hydrocarbon, for example, methane.

*Example 2*

The process is carried out as in Example 1 but substituting powdered cobalt for powdered nickel.

In a similar way compositions containing iron and cobalt and/or nickel can be made.

The following example illustrates the use of the compositions of the invention in the reduction of carbon monoxide.

*Example 3*

Each of a number of externally heated copper tubes is charged with the composition obtained according to Example 1. A mixture of carbon monoxide and hydrogen in molecular proportions of 1:3 respectively is passed through the tubes at a space velocity of 70. The issuing gas contains methane in a proportion corresponding to a 30% conversion.

Instead of the composition of Example 1, that of Example 2 may be used.

By substituting iron for nickel in Example 1 and reducing the mixed oxides preferably at a somewhat higher temperature, e. g. at between 500 and 800° C., for instance at about 700° C., a composition particularly useful for the production of hydrogen from steam or water by the Lane or Bergius processes can be made as described and claimed in copending application No. 242,562 filed November 26, 1938.

Besides the heavy metals, other substances may be incorporated in or applied to the novel metallic compositions. Such other substances may be applied after or incorporated at any stage during the production of the composition; for instance, in producing catalysts suitable for synthesising hydrocarbons from oxides of carbon and hydrogen, a substance such as thorium oxide may be applied to or incorporated in the composition, while in the production of acetone from ethyl alcohol a composition according to the invention containing iron may be subjected to conditions which cause superficial rusting of the iron and/or calcium acetate may be applied to the catalyst.

Valuable metallic compositions can be made by reducing intimate mixtures of the heavy metal oxides whether or not such mixtures have been made by reduction of a higher oxide of one of the metals by the other metal or intimate mixtures of one of the metals with an oxide of the other may be reduced. The production of the oxide or oxides in a fine state of division may be effected by grinding or may involve precipitation of a compound of the metal or metals from solution, for instance the precipitation of a hydroxide from a solution of a metal salt. Where a mixture of metal oxides is to be employed co-precipitation affords a ready method of obtaining thorough admixture. Compounds formed by precipitation, e. g. hydroxides or carbonates, may be employed as such in the process of the invention, especially when they are transformed into oxides by heat at relatively low temperatures.

Having described our invention, what we desire to secure by Letters Patent is:

1. Process for the production of a substantially non-friable metallic composition useful as a catalyst for the hydrogenation of carbon compounds, which comprises forming a porous structure of an oxide of one heavy metal permeated with, and serving as the support for, the oxide of another heavy metal having a higher affinity for oxygen, by heating an intimate mixture of the second metal with the oxide of the first metal, both oxides being reducible to the respective metals by means of a gaseous reducing agent, and thereafter reducing the resulting composition by means of a gaseous reducing agent.

2. Process for the production of a substantially non-friable metallic composition useful as a catalyst for the hydrogenation of carbon compounds, which comprises forming a porous structure of an oxide of one heavy metal permeated with, and serving as the support for, the oxide of another heavy metal having a higher affinity for oxygen, by heating an intimate mixture of the second metal with the oxide of the first metal, both oxides being reducible to the respective metals by means of a gaseous reducing agent, breaking down the sintered composition to a suitable size and reducing the resulting composition by means of a gaseous reducing agent.

3. Process for the production of a substantially non-friable metallic composition useful as a catalyst for the hydrogenation of carbon compounds, which comprises forming a porous structure of cuprous oxide permeated with, and serving as the support for, nickel oxide by heating an intimate mixture of nickel with cupric oxide, breaking down the sintered composition to a suitable size and reducing the resulting composition by means of a gaseous reducing agent.

4. Process for the production of a substantially non-friable metallic composition useful as a catalyst for the hydrogenation of carbon compounds, which comprises forming a porous structure of cuprous oxide permeated with, and serving as the support for, cobalt oxide by heating an intimate mixture of cobalt with cupric oxide, breaking down the sintered composition to a suitable size and reducing the resulting composition by means of a gaseous reducing agent.

5. Process for the production of a substantially non-friable metallic composition useful as a catalyst for the hydrogenation of carbon compounds, which comprises forming a porous structure of an oxide of one heavy metal permeated with, and serving as the support for, the oxide of another heavy metal having a higher affinity for oxygen, by heating an intimate mixture in substantially equal proportions of the second metal with the oxide of the first metal, both oxides being reducible to the respective metals by means of a gaseous reducing agent, and thereafter reducing the resulting composition by means of a gaseous reducing agent.

6. Process for the production of a substantially non-friable metallic composition useful as a catalyst for the hydrogenation of carbon compounds, which comprises forming a porous structure of cuprous oxide permeated with, and serving as the support for, the oxide of another heavy metal having a higher affinity for oxygen, said oxide being reducible to the corresponding metal by means of a gaseous reducing agent, by heating to sintering temperature in a non-reducing atmosphere an intimate mixture in substantially equal proportions of the second metal with cupric oxide, and thereafter reducing the resulting composition by means of a gaseous reducing agent.

7. Process for the production of a substantially non-friable metallic composition useful as a catalyst for the hydrogenation of carbon compounds, which comprises forming a porous structure of cuprous oxide permeated with, and serving as the support for, nickel oxide by heating an intimate mixture in substantially equal proportions of nickel with cupric oxide, breaking down the sintered composition to a suitable size and reducing the resulting composition by means of a gaseous reducing agent.

8. Process for the production of a substantially non-friable metallic composition useful as a catalyst for the hydrogenation of carbon compounds, which comprises forming a porous structure of cuprous oxide permeated with, and serving as the support for, cobalt oxide by heating an intimate mixture in substantially equal proportions of cobalt with cupric oxide, breaking down the sintered composition to a suitable size and reducing the resulting composition by means of a gaseous reducing agent.

WALTER HENRY GROOMBRIDGE.
JOHN EDWARD NEWNS.